US006460518B1

(12) United States Patent
Streib

(10) Patent No.: US 6,460,518 B1
(45) Date of Patent: Oct. 8, 2002

(54) METHOD FOR VERIFYING THE TIGHTNESS OF A TANK SYSTEM IN A MOTOR VEHICLE

(75) Inventor: Martin Streib, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/958,538

(22) PCT Filed: Jan. 25, 2001

(86) PCT No.: PCT/DE01/00287
§ 371 (c)(1),
(2), (4) Date: Nov. 30, 2001

(87) PCT Pub. No.: WO01/59286
PCT Pub. Date: Aug. 16, 2001

(30) Foreign Application Priority Data

Feb. 11, 2000 (DE) .......................................... 100 06 185

(51) Int. Cl.[7] .............................................. F02M 37/04
(52) U.S. Cl. ...................................................... 123/520
(58) Field of Search ................................ 123/516, 518, 123/519, 520, 198 D

(56) References Cited

U.S. PATENT DOCUMENTS

| 5,477,837 | A | * | 12/1995 | Ikebuchi ..................... 123/520 |
| 5,890,474 | A | | 4/1999 | Schnaibel et al. |
| 6,082,337 | A | * | 7/2000 | Fujimoto et al. ........... 123/520 |
| 6,131,550 | A | | 10/2000 | Fritz et al. |
| 6,148,803 | A | * | 11/2000 | Majima et al. .............. 123/520 |

FOREIGN PATENT DOCUMENTS

| FR | 2781881 | 2/2000 |
| JP | 11 326110 | 11/1999 |
| JP | 11 343926 | 12/1999 |

* cited by examiner

Primary Examiner—Thomas N. Moulis
(74) Attorney, Agent, or Firm—Walter Ottesen

(57) ABSTRACT

A method for checking the tightness of a tank system, especially of a tank-venting system of a vehicle, wherein an overpressure or an underpressure relative to the atmospheric pressure is introduced into the tank system by means of a pressure source and the time-dependent trace of at least one operating characteristic variable of the pressure source is detected when introducing the overpressure/underpressure up to reaching a first time point or a first pressure level and is compared to a time-dependent trace of the operating characteristic value up to this time point or up to this pressure level (expected diagnostic trace), the time-dependent trace being expected in the case of a tight tank system, and, a conclusion as to non-tightness is drawn when the detected time-dependent trace deviates from the expected diagnostic trace by at least a pregiven value, characterized in that, when a deviation is determined, the overpressure/underpressure in the tank-venting system is further increased up to reaching a second time point or a second pressure level; the operating characteristic value of the pressure source continues to be detected and compared to an expected further time-dependent trace of the operating variable in the case of a tight system (further diagnostic trace) and, a fault announcement is only then outputted when the detected time-dependent trace during the introduction of the further overpressure/underpressure deviates from the further diagnostic trace.

3 Claims, 3 Drawing Sheets

(State of the Art)

METHOD FOR VERIFYING THE TIGHTNESS OF A TANK SYSTEM IN A MOTOR VEHICLE

FIELD OF THE INVENTION

The invention relates to a method for checking the tightness of a tank system.

BACKGROUND OF THE INVENTION

A method for checking the tightness of the tank-venting system of a vehicle is disclosed, for example, in U.S. Pat. Nos. 5,890,474 and 6,131,550.

In the above, an overpressure is introduced into a tank-venting system by means of a pressure source and the time-dependent trace of at least one operating characteristic variable of the pressure source is detected while introducing the overpressure. This time-dependent trace is compared to a time-dependent trace of the operating characteristic variable (diagnostic trace), which is expected in the case of a tight tank system. This expected time-dependent trace is, for example, previously measured, computed or estimated. A conclusion is then drawn as to non-tightness when the detected time-dependent trace deviates from the diagnostic trace by at least a pregiven value. The pump current of a pump is used, for example, as the diagnostic trace. The diagnostic trace corresponds to the pump current which occurs when an overpressure is introduced into a tank-venting system having a pregiven reference leak having, for example, a diameter of 0.5 mm. In this case, the current of the pump is compared to a reference current during introduction of the overpressure. The absolute current level can vary greatly for the same leak size because of ambient conditions and tolerances. Independently of the absolute level, a fine leak having a diameter of 0.5 mm can, however, be excluded if, during the introduction of the overpressure by pumping, a current level is reached which is greater than the reference current. If this current level is not reached, then a conclusion can be drawn as to a fine leak having a diameter of $\geq 0.5$ mm.

In contrast, a large leak having a diameter of 1 mm or more cannot be detected from the method of tightness checking of tank-venting systems known from the state of the art. When pumping against a reference leak, and when a leak is present having a diameter of approximately 1 mm, any desired current level can be reached after a certain pregivable time in dependence upon ambient conditions and component tolerances. A reliable decision is therefore not possible in this manner as to whether a large is leak is present having a diameter of 1 mm or more.

In view of the above, it is, for example, conceivable that a pregiven pump current is not yet reached after a pregiven time for a leak having a diameter of only 0.4 mm (for which no fault output is required), so that a fault would be outputted in the methods known from the state of the art.

On the other hand, for other tolerances, a pregiven current threshold can be reached also for a leak having a diameter of more than 1 mm in a time interval, which is less than a pregiven diagnostic time interval and this would lead to the situation that a fault output would not take place.

SUMMARY OF THE INVENTION

In view of the above, it is a task of the invention to improve a method for checking the tightness of a tank system of a vehicle so that a reliable detection of large leaks having a diameter of $\geq 1$ mm is possible independently of tolerance-caused disturbances and/or environmentally-caused disturbances of the operating characteristic value during the introduction of an overpressure into the tank system.

The advantage of the method of the invention is that, to a certain extent, it is possible to verify an initially expected untightness or to show that it is false via the following: a further diagnostic trace (that is, a further introduction of an overpressure or underpressure into the tank system); the detection of the operating variable of the pressure source when introducing this additional overpressure or underpressure until reaching a second time point or a second pressure level; a comparison of the so detected operating characteristic variable to a time-dependent trace of the operating characteristic variable (expected for a tight tank system) when introducing the additional overpressure; and, the output of a fault announcement only when a determination is made of a deviation of the detected operating characteristic variable from the diagnostic trace by at least a pregiven value and when there is a deviation of the operating characteristic variable from the further diagnostic trace by at least a pregiven value. With this verification or showing to be false, faults can be eliminated which are caused especially by ambient influences or component tolerances.

With the method of the invention, large leaks having a diameter of 1 mm or greater than 1 mm can be recognized with high accuracy. On the other hand, leaks having a diameter of less than 1 mm do not lead to fault announcements.

The electric current of an overpressure pump/underpressure pump is advantageously detected as an operating characteristic variable of the pressure source. For this reason, it is not only possible to accurately detect significant changes of the operating state of the pressure source but the detected electric current can also be directly further processed in evaluation circuits or the like in an advantageous manner.

As to the time-dependent trace of the operating characteristic variable (that is, the electric current), the current could, in principle, be detected continuously over time and the functional trace shown in this manner could be compared to a time-dependent trace which was previously measured, computed or estimated.

An especially advantageous embodiment provides that the pump current is compared to the expected current values for a tight tank system after the elapse of pregiven time intervals and a fault announcement is only outputted when the detected pump current, after the elapse of the first time interval, deviates from an expected current value for a tight tank system as well as, after the elapse of the second time interval, deviates from a second expected current value for a tight tank system.

With the comparison of these values, a very accurate leak detection of a tank-venting system is also possible. A significantly reduced storage complexity is required when compared to the detection of the time-dependent trace of the current intensity.

DESCRIPTION OF THE PRFERRED EMBODIMENTS OF THE INVENTION

The invention is described in the following with respect to an example of a tank-venting system of a motor vehicle. It is, however, understood that the method of the invention can be used not only for a tank-venting system but for any desired tank system.

Figure 1:
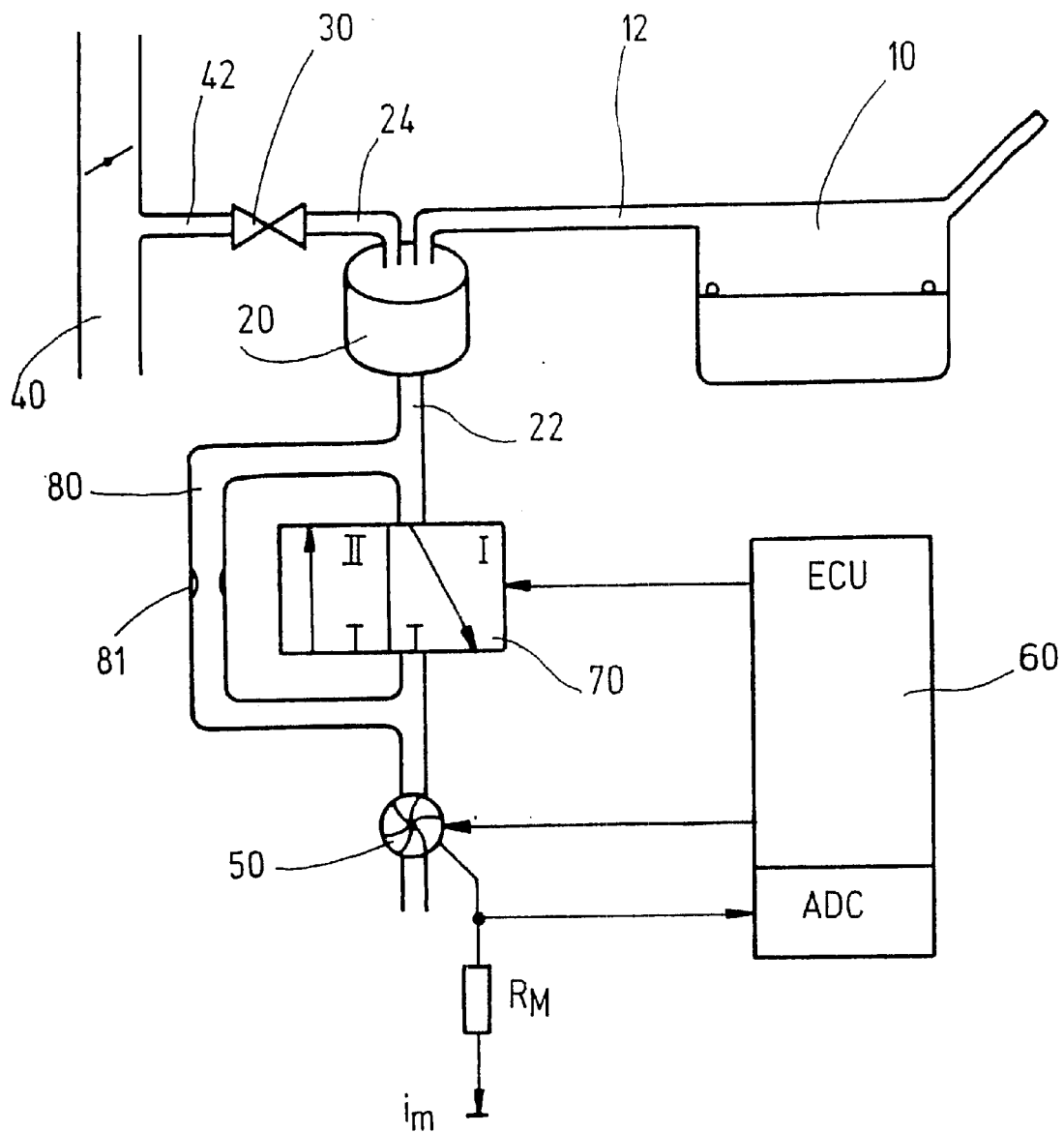
FIG. 1 schematically shows a tank-venting system of a vehicle known from the state of the art wherein the method, which makes use of the invention, is applied.

A tank-venting system of a motor vehicle tank system is shown in FIG. 1 and includes a tank 10, an adsorption filter 20 (for example, an active charcoal filter), a venting line 22 connectable to the ambient and a tank-venting valve 30. The adsorption filter 20 is connected to the tank 10 via a tank connecting line 12. The tank-venting valve 30 is connected, on the one hand, to the adsorption filter 20 via a valve line 24 and, on the other hand, to an intake manifold 40 of an internal combustion engine (not shown) via a valve line 42.

Hydrocarbons develop in the tank 10 because of vaporization and these hydrocarbons deposit on the adsorption filter 20. To regenerate the adsorption filter 20, the tank-venting valve 30 is opened so that air of the atmosphere is drawn by suction through the adsorption filter 20 because of the underpressure present in the intake manifold 40. In this way, the hydrocarbons deposited on the absorption filter 20 are drawn by suction into the intake manifold 40 and supplied to the engine.

In order to check the operability of the tank-venting system, a pump 50 is provided which is connected to a circuit unit 60. A switchover valve 70 is switched downstream of the pump 50 and this valve can, for example, be in the form of a 3/2 directional valve. A reference leak 81 is arranged in a separate branch 80 parallel to this switchover valve 70. The size of the reference leak 81 is so selected that this leak corresponds to the size of the leak to be detected. The size can, for example, be so selected that it corresponds to a reference leak having a diameter of 0.5 mm.

It is understood that the reference leak 81 can, for example, also be part of the switchover valve 70, that is, as a channel construction or the like so that, in this case, an additional reference part can be omitted (not shown).

The tightness check of the tank-venting system is, for example, explained in detail in DE 196 36 431 A1 or in DE 198 09 384 A1 incorporated fully herein by reference. By detecting the current to be supplied to the pump, it can be determined whether the pumped flow, which is to be introduced into the tank-venting system by the pump source in the form of the pump 50, deviates from a pumped flow which is present when introducing an overpressure via the reference leak. For this purpose, the time-dependent trace of the current, which results when the voltage is applied to the pump 50, is detected. It is noted that the invention is not limited to the introduction of an overpressure; rather, the tightness check can likewise be undertaken by introducing an underpressure. In both cases, possibly present leaks can be determined.

The method for checking tightness is explained in greater detail in the following in connection with FIG. 2 wherein the pump current is shown schematically as a function of time and in connection with FIG. 3 which schematically shows a flowchart of the method.

Figure 2:
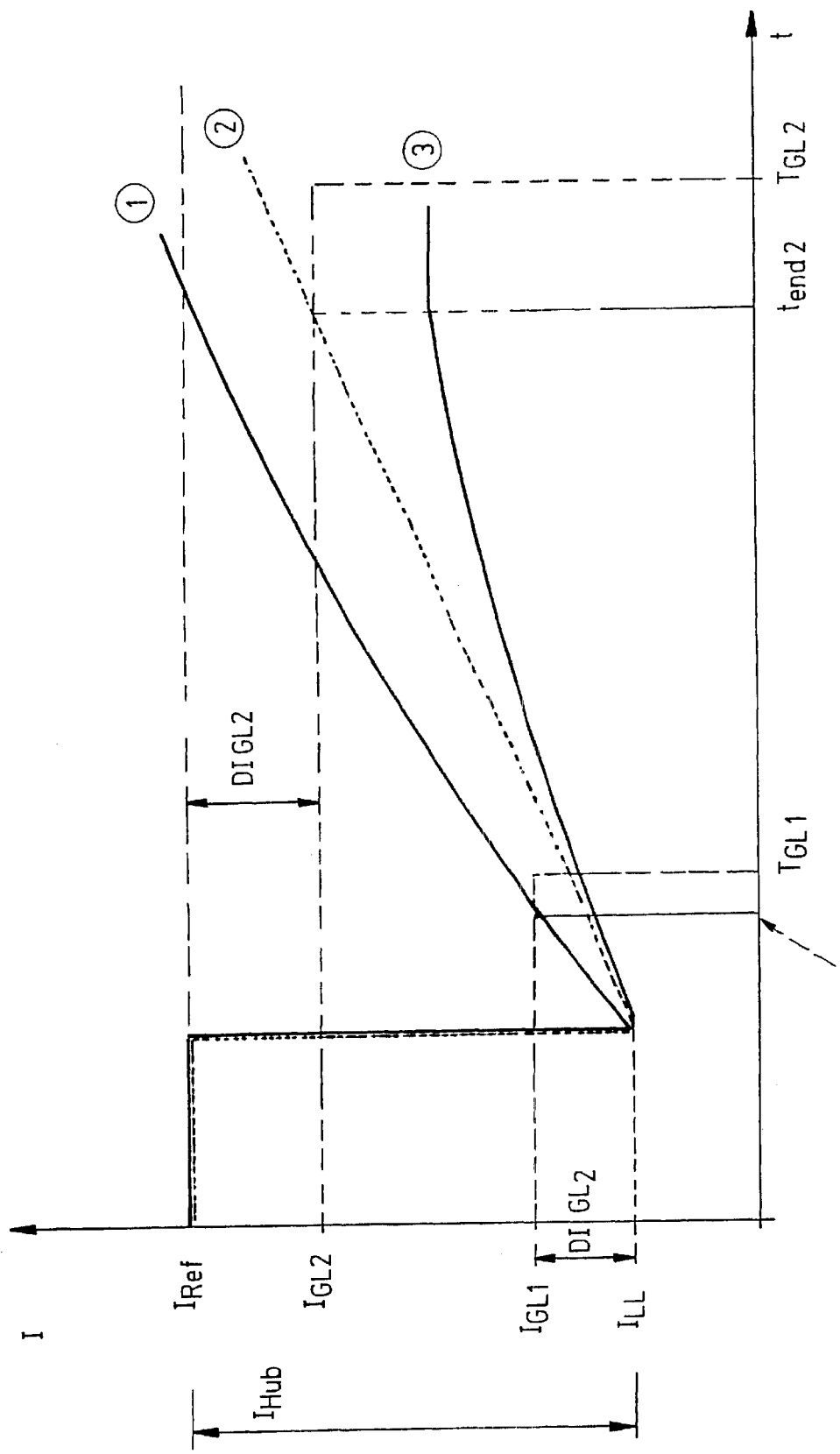
FIG. 2 schematically shows the time-dependent trace of the pump current of a pump for introducing an overpressure into the tank-venting system of a vehicle; and, FIG. 3 schematically shows a flowchart of an embodiment of the method, which makes use of the invention, for checking the tightness of a tank-venting system of a vehicle.
Figure 3:
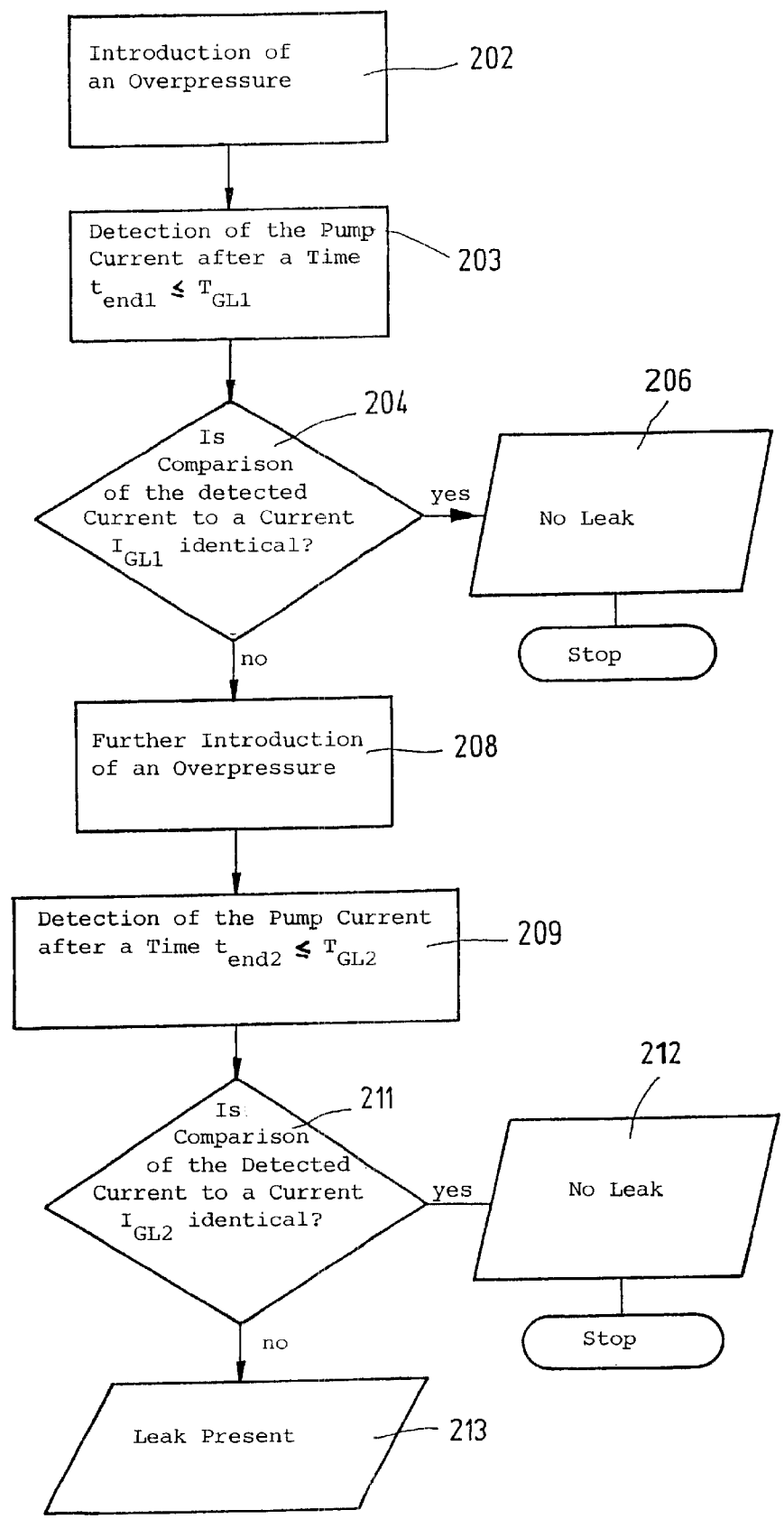

First, an overpressure is introduced into the tank-venting system in step 202 (FIG. 3). Here, the time-dependent pump current is detected. As shown in FIG. 2, a reference current $I_{Ref}$ is first applied to the pump 50. In this state, the switchover valve 70 is in the position identified by I in FIG. 1. In this position of the switchover valve 70, a pumped flow is introduced by the pump or pressure source 50 into the tank-venting system via the reference leak 80. Here, the current $I_{Ref}$ adjusts as shown schematically in FIG. 2 and is essentially constant over time. As soon as the switchover valve 70 is switched over from the position I into the position II, the pressure source or pump 50 applies an overpressure (step 202) to the tank-venting system. When switching over, the motor current first drops rapidly by a value $I_{stroke}$ and thereafter increases continuously over time. It can be assumed that no leak is present when the detected pump current reaches a current level $I_{GL1}$ after a time tend (step 203) which is less than a pregivable time $T_{GL1}$, which current level deviates by a difference DIGL2 from an idle current $I_{LL}$ of the pump (FIG. 2). Stated otherwise, the pump current reaches in a time $t=t_{end1}$, which is less than a pregiven time $T_{GL1}$, a current level $I_{GL1}$, which exceeds the idle current $I_{LL}$ by a pregiven threshold DIGL2. In this case, as shown schematically in FIG. 3, for example, the tightness check can be ended after output of an announcement "no leak" in step 206. This case is shown schematically in FIG. 2 by the curve identified by 1. The continuation of the curve I for a time $t>t_{end1}$ shows the current trace which would result if pumping were continued. As shown above, the diagnosis is, however, interrupted when the detected current corresponds to the current $I_{GL1}$ which is determined in step 204.

However, if the detected current does not correspond to the pregiven value $I_{GL1}$, a leak could be present. On the other hand, a falsification of the result could also be present because of ambient conditions and/or tolerances, which can lead to a large variation of the detected current. Thus, it is for example conceivable that the current $I_{GL1}$ is not yet reached after the time $t_{GL1}$ for a leak of only 0.4 mm (for which no fault need be indicated) so that a fault announcement would be erroneously outputted and stored. A case of this kind is shown schematically in FIG. 2 with respect to the current-time trace identified by 2.

Oppositely, the threshold $T_{GL1}$ could, for example, be reached in a time $t<T_{GL1}$, for example, for other tolerances and for a leak having a diameter greater than 1 mm, whereby a leak which would have to be indicated would not be detected.

In order to exclude errors of this kind and as shown in connection with the current-time trace identified by 2 in FIG. 2, the tightness check is continued up to a maximum time $T_{GL2}>>T_{GL1}$ rather than an immediate fault announcement and a fault entry in a memory. If a level $I_{GL2}$ is reached after a time $t <T_{GL2}$ (for example, at a time $t=t_{end2}$), then it can be assumed that no leak having a diameter $\geq 1$ mm is present. The original "large leak suspicion" in step 204 is therefore not confirmed in this case but was only caused by tolerances and/or the environment. This check takes place in steps 209, 211 (FIG. 3). It is indicated in this case that no large leak is present and the tightness check is interrupted at $t_{end2}$. (The continuation of the curve identified by 2 beyond $t_{end2}$ only shows the theoretical further trace of the current for the case that pumping was continued).

If, in contrast, a current-time trace adjusts as shown schematically in FIG. 2 by the curve identified by 3 (wherein the level $I_{GL2}$ is not yet reached after the time $t_{GL2}$), it is clear that a leak is present for a corresponding application of the threshold $I_{GL2}$ which leak is at least not significantly smaller than a leak having a diameter of 1 mm. Because of the higher current level closer to the reference current $I_{Ref}$, tolerances play significantly less of a role in this case. The "initial suspicion" set at time $t=T_{GL1}$ (see step 204) is, in this case, confirmed and a fault announcement is outputted and entered in a memory in step 213.

The applications of the current thresholds $I_{GL1}$, $I_{GL2}$ takes place, for example, via earlier measurements, computations or estimates.

The current threshold $I_{GL2}$ is, for example, specified as the difference of reference current $I_{Ref}$ and a value DIGL2. The value DIGL2 is a function of $I_{Ref}-I_{LL}$. Equivalent to this, $I_{GL2}$ can be determined also as the sum of $I_{LL}$ and DIGL2* wherein DIGL2* is likewise a function of $I_{Ref}-I_{LL}$.

The advantage of the above-described method is that a leak can be very precisely detected independently of environmental conditions or module tolerances. To a certain extent, an "initial suspicion" as to a leak can be confirmed or disregarded by the additional introduction of an overpressure into the tank-venting system.

The above-described method is explained in combination with the detection of current values. It is, however, noted that the method is in no way limited to the detection of current values but any desired operating characteristic variable of the pump can be considered especially also the pressure generated thereby for the detection of leaks in a tank system. The method described above only sets forth an especially advantageous embodiment.

What is claimed is:

1. A method for checking the tightness of a tank system including the tightness of a tank-venting system of a vehicle, the method comprising the steps of:

introducing an overpressure or an underpressure relative to the atmospheric pressure into the tank system utilizing a pressure source and detecting the time-dependent trace of at least one operating characteristic variable of the pressure source when introducing the overpressure/underpressure up to reaching a first time point or a first pressure level;

comparing said time-dependent trace to a time-dependent trace of the operating characteristic value up to this time point or up to this pressure level (expected diagnostic trace), the time-dependent trace being expected in the case of a tight tank system;

drawing a conclusion as to non-tightness when the detected time-dependent trace deviates from the expected diagnostic trace by at least a pregiven value;

when a deviation is determined, further increasing the overpressure/underpressure in the tank-venting system up to reaching a second time point or a second pressure level;

continuing to detect the operating characteristic variable of the pressure source and comparing said operating characteristic variable to an expected further time-dependent trace of the operating variable in the case of a tight system (further diagnostic trace); and, outputting a fault announcement only when the detected time-dependent trace during the introduction of the further overpressure/underpressure deviates from the further diagnostic trace.

2. The method of claim 1, wherein the pump current of an overpressure pump/underpressure pump is detected as an operating characteristic variable.

3. The method of claim 2, the method comprising the further steps of:

comparing the pumped current to the expected current values for a tight tank system after the elapse of the pregiven time intervals; and, outputting a fault announcement only when the detected pump current deviates from a first expected value in a tight tank system after the elapse of the first time interval as well as deviates from a second expected current value for a tight tank system after the elapse of the second time interval.

* * * * *